April 7, 1925.
A. G. RONNING ET AL
1,532,266
CUTTER FOR ENSILAGE HARVESTERS AND THE LIKE
Filed Nov. 14, 1919    5 Sheets-Sheet 5
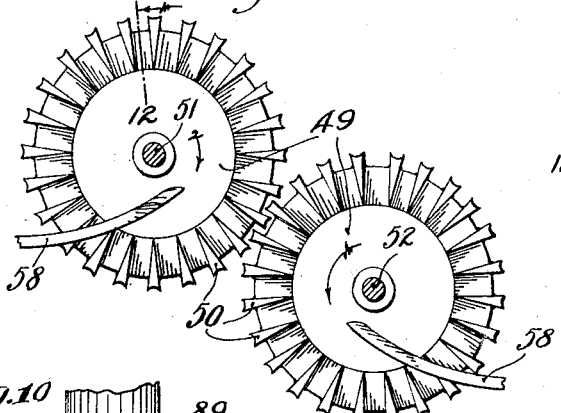
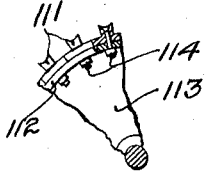
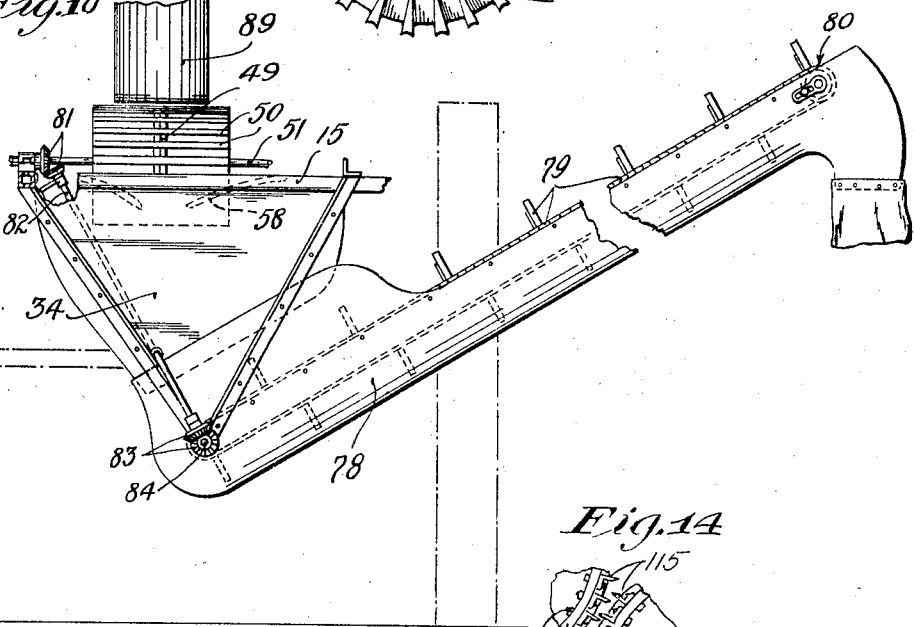
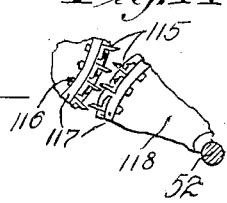
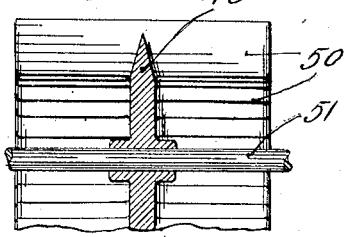
Inventors
Andrean G. Ronning
Adolph Ronning
By their Attorneys Patented Apr. 7, 1925.

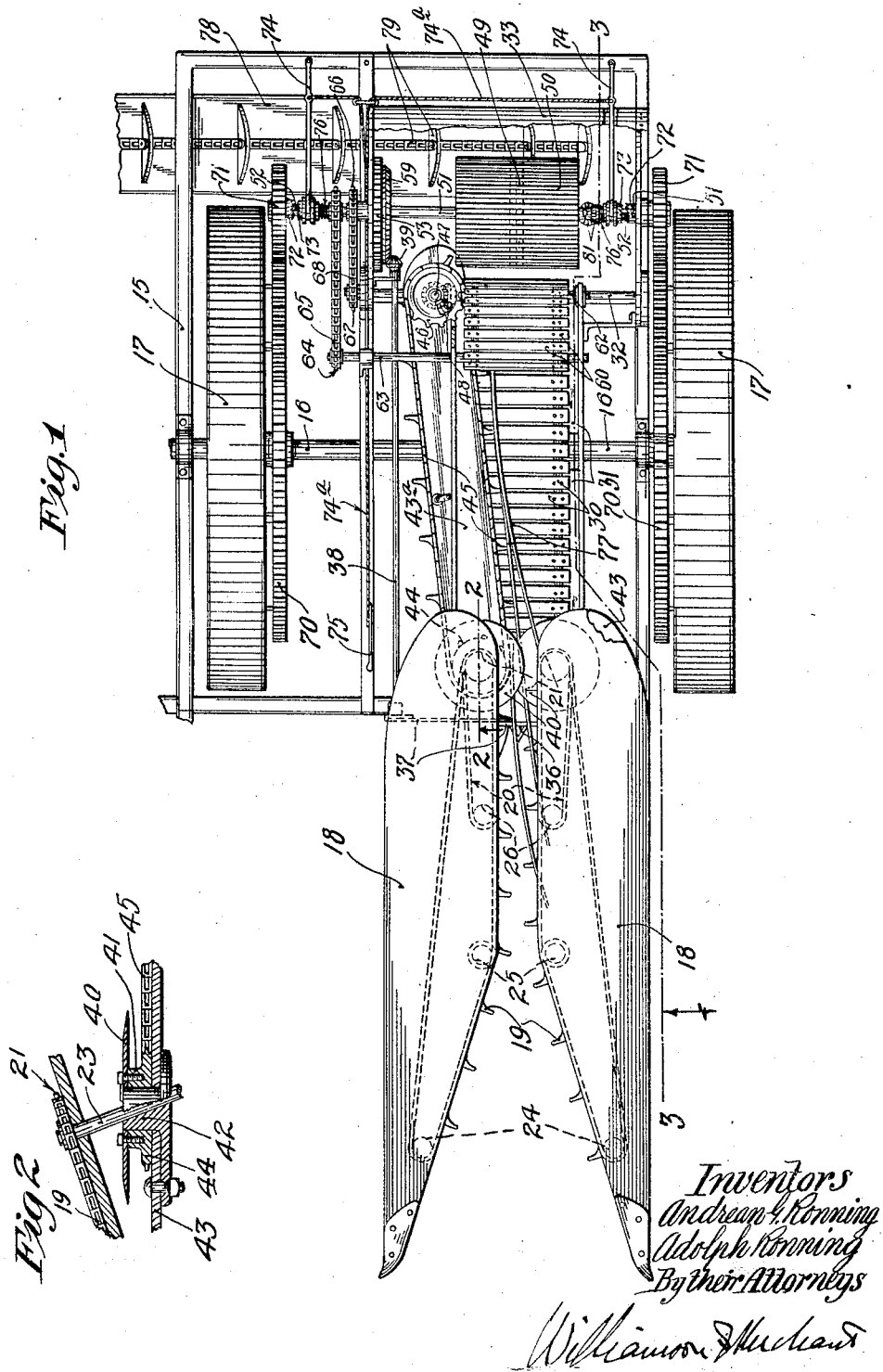

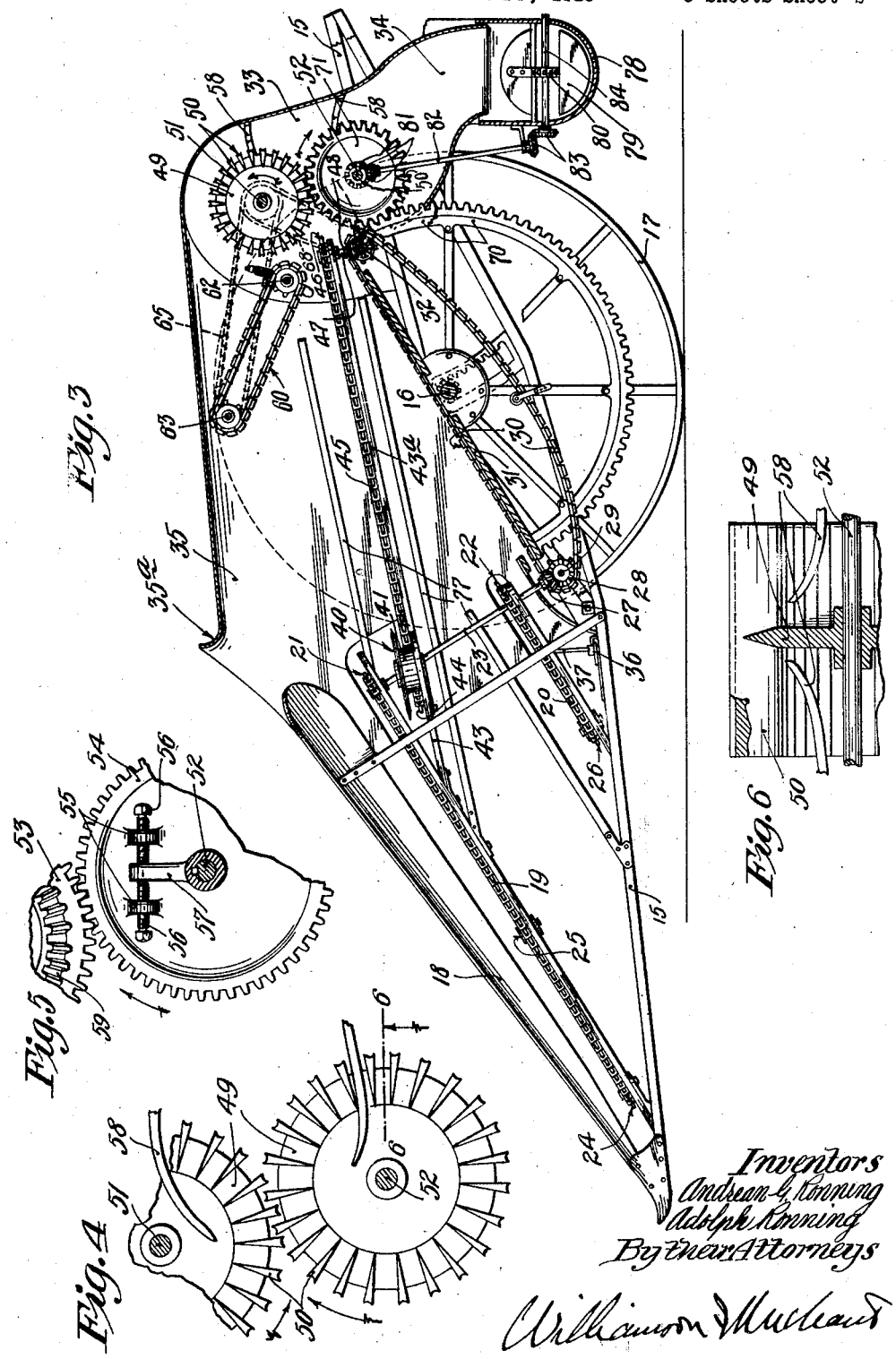

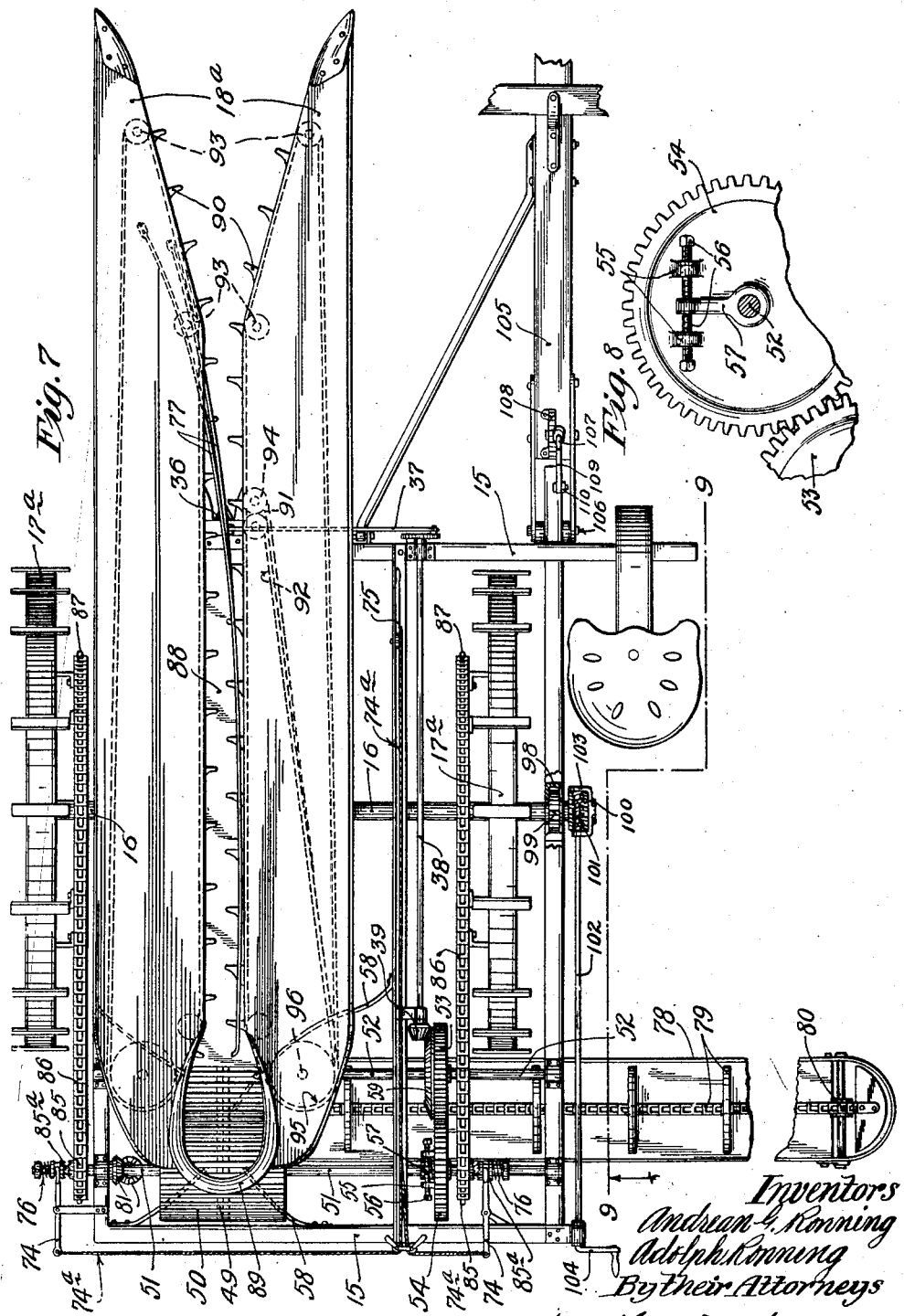

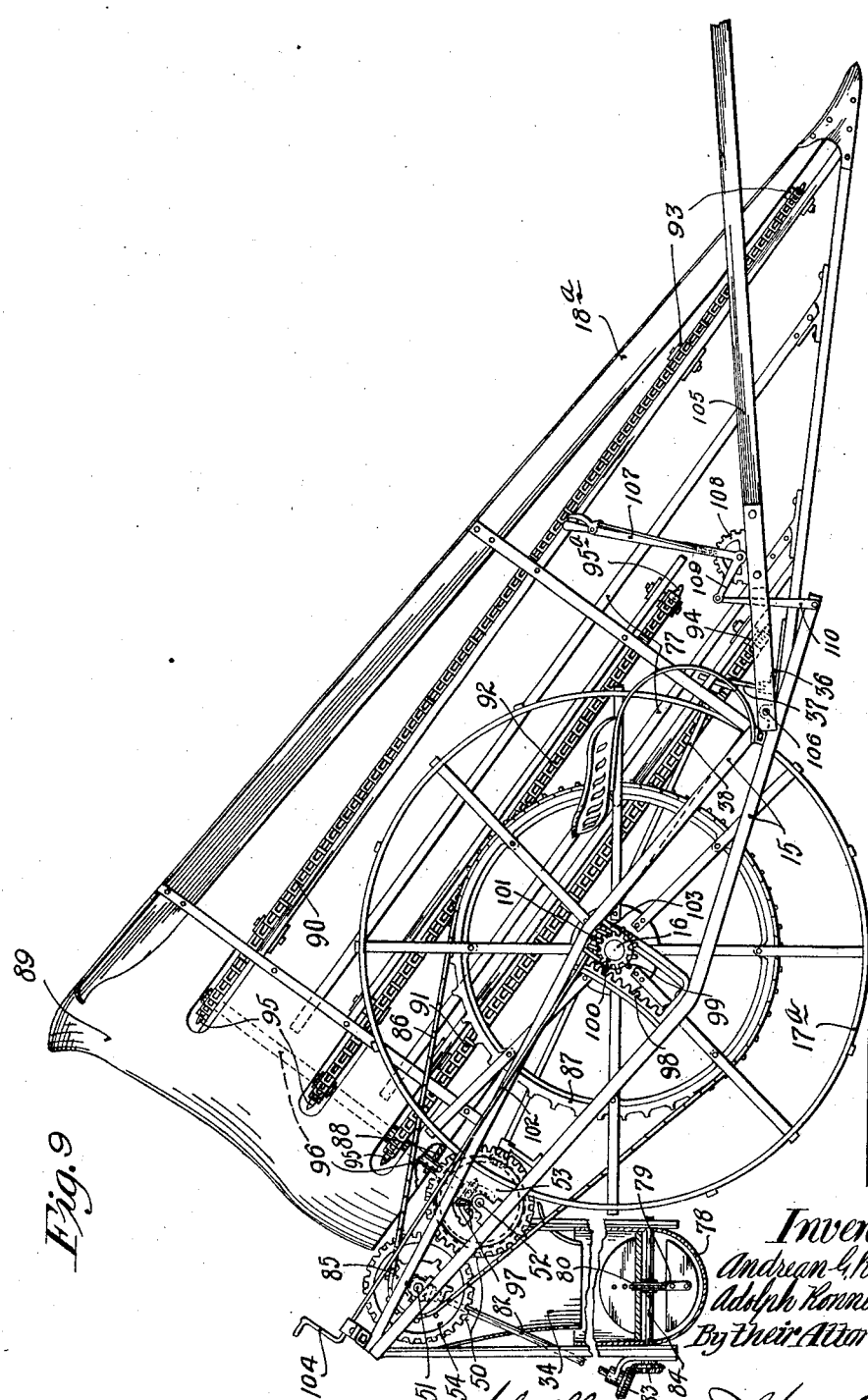

1,532,266

UNITED STATES PATENT OFFICE.

ANDREAN G. RONNING AND ADOLPH RONNING, OF MINNEAPOLIS, MINNESOTA.

CUTTER FOR ENSILAGE HARVESTERS AND THE LIKE.

Application filed November 14, 1919. Serial No. 337,979.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Cutters for Ensilage Harvesters and the like; and we do hereby declare the following to be a full, clear, and exact description of the invention, such as will enable others skilled in the art to which it appertains to make and use the same.

Our present invention relates particularly to that type of agricultural machines known as ensilage harvesters and is directed primarily to the provision of an improved ensilage cutter, but involves other features of novelty as will hereinafter appear.

Generally stated, the invention consists of the novel devices and combinations of devices hereinafter described and defined in the claims.

The ensilage cutter involves a radically new departure from old lines of cutters and is of such nature that the cutting elements have a combined cutting and feeding action on the stalks. In its preferred embodiment, the ensilage cutter comprises two rotary drums having circumferentially spaced radially projecting and longitudinally extended intermeshing blades that run together somewhat like gears. Otherwise stated, in the present arrangement, the cutter drums are sort of squirrel cage structures having hollow interiors into which the cut ensilage may be forced, and then forced, or crowded out through the ends of the drums.

As another feature, the invention involves an important relative arrangement of primary stalk cutter and co-operating means for delivering the cut down stalks to the ensilage cutter, the said means including devices whereby long stalks will be cut in two, and the severed ends turned inward and delivered endwise to the ensilage cutter.

The invention is illustrated in the accompanying drawings wherein like characters indicate like parts throughout the several views. Referring to the drawings:

Fig. 1 is a plan view of the complete ensilage harvester;

Fig. 2 is a detail through certain parts in vertical section, approximately on the line 2—2 of Fig. 1;

Fig. 3 is a vertical section taken through the harvester approximately on the line 3—3 of Fig. 1, some parts being shown in elevation;

Fig. 4 is a side elevation of the ensilage cutter shown in Figs. 1 and 3;

Fig. 5 is a fragmentary view in side elevation showing the gears which connect the ensilage cutting drums or wheels in intermeshing rotation in synchronism;

Fig. 6 is a fragmentary section on the line 6—6 of Fig. 4;

Fig. 7 is a plan view illustrating the somewhat modified construction of the ensilage harvester;

Fig. 8 is a view corresponding to Fig. 5; but showing the gears that connect the cutting drums of the machine illustrated in Fig. 7;

Fig. 9 shows the machine illustrated in Fig. 7 chiefly in side elevation but with some parts sectioned on the line 9—9 of Fig. 7;

Fig. 10 is a rear elevation of the ensilage harvester shown in Figs. 7 and 9, some parts being diagrammatically indicated by dotted lines only and some parts being broken away;

Fig. 11 is a side elevation of the ensilage cutter shown in Figs. 7, 9 and 10;

Fig. 12 is a section on the line 12—12 of Fig. 11;

Fig. 13 is a fragmentary view partly in side elevation and partly in section illustrating a modified form of one of the ensilage cutting drums; and Fig. 14 is a similar view showing a still further modified form of ensilage cutting drum.

The mechanism illustrated in Figs. 1 to 6, inclusive, will first be described.

The parts of the ensilage harvester, generally, may be briefly described as follows:

A suitable framework 15 is carried by an axle 16 upon which laterally spaced traction wheels 17 are loosely journaled so that they carry the entire weight of the harvester. Secured to and projecting forward from the main frame 15 is a pair of laterally spaced gathering forks 18 upon each of which is arranged to run a pair of oblique gathering chains 19 and 20 that are arranged to run, respectively, over sprockets 21 and 22 carried by oblique shafts 23 journaled in suitable bearings on the said gathering forks. The upper gathering chains 19 are much longer than the lower gathering chains 20. Said chains 19 run also over idle guiding sprockets 24 and 25 on the said frame 18 while the gathering chains 20, at their lower portions, run over idle sprockets 26 on the said gathering frames. At their lower ends, the oblique shafts 23 are provided with beveled pinions 27 that mesh with beveled gears 28 on a sprocket-equipped shaft 29, which latter drives an endless oblique stalk delivery apron or belt 30. This endless apron 30 runs over an inclined deck 31 supported by the main frame 15, and at its upper portion, it runs over a sprocket-equipped shaft 32 journaled in suitable bearings afforded by the sides of the hood 33 mounted on the rear portion of frame 15. A hood 33 is provided with a depending discharge spout 34 and with a forwardly extended hood top 35, the front end of which terminates, preferably vertically over the rear portions of the gathering chains 19 and terminates in an upturned edge 35ª that performs an important function presently to be noted.

The standing stalks gathered between the forks 18 and between the laterally spaced gathering chains 19 and 20 will be guided to a primary stalk cutter for severing the stalks from the roots. This primary stalk cutter, so far as this invention is concerned, may be in any suitable form, but as shown, includes a blade-equipped sickle bar 36 that is guided for reciprocating movements on the front bar of the main frame 15, working just below the channel formed between the gathering forks and gathering chains, just in front of the delivery apron 30, and it is connected by a pitman 37 (see Fig. 1) to a crank-equipped front end of a longitudinal shaft 38 mounted in suitable bearings on the frame 15 and provided at its rear end with a beveled pinion 39.

For cutting in two, long stalks, or all but the very short stalks, we provide a so-called secondary cutter, preferably in the form of two co-operating overlapping sharp edged rotary disks 40 (see particularly Figs. 1, 2 and 3) that are secured to hubs 41 journaled on sleeves 42 rigidly secured to supports 43 that form rigid parts of the respective gathering forks 18. One of the supports 43 is provided with a long board extension 43ª that extends above and at one side of the delivery apron 30.

The stalks delivered to the secondary cutter 40 will stand much more nearly erect than the shafts 23, and hence, the said shafts 23 (see particularly Figs. 2 and 3) are obliquely extended through and journaled in the bearing sleeves 42. The hub 41 that is on the same side as the board extension 43ª is provided with a sprocket 44. A tooth-equipped sprocket chain 45 that lies just above the board extension 43ª, runs over the sprocket 44 and over a sprocket 46 that is on the upper end of a short upright shaft 47 journaled in the rear end of the board extension 43ª. At its lower end, this shaft 47 is connected to the inner or right hand end of the sprocket-equipped shaft 32 by a pair of miter gears 48.

The ensilage cutter will next be described. Referring to the construction thereof, attention is first called to Figs. 1, 3, 4, 5 and 6.

In the construction here illustrated, this ensilage cutter comprises two drum-like rotary cutters, each comprising a disk-like central cutter 49 provided with circumferentially spaced transversely projecting cutter blades 50 so disposed that radial passages are formed to the said blades on the opposite sides of the said disks. The disks 49 are provided with hubs rigidly secured, the one to an upper driving shaft 51, and the other to a lower driving shaft 52, the said two shafts being suitably journaled in bearings on the frame 15 and the said two cutting wheels being located within the hood 33 in position to receive the stalks directly from the upper portion of the delivery apron 30. The two shafts 51 and 52 are geared to run in synchronism by intermeshing spur gears 53 and 54 secured, respectively, to the said shafts 51 and 52. The blades of the two cutting drums intermesh and run together but should not come into actual contact and to provide for accurate setting thereof, one of the gears 53—54 is secured to its shaft by means permitting of slight circumferential adjustment in respect thereto. As shown, the gear 54 is provided with laterally spaced lugs 55 with set screws 56 that engage the opposite sides of an arm 57 rigidly secured to the shaft 52 (see particularly Fig. 5).

The outer edges of the cutting blades 50 of the ensilage cutting drum are wide and are concavely ground so that they will have sharp cutting edges at each side of the outer portion of each cutter blade. (See particularly Fig. 4.) The stalks, as they are cut into ensilage, will be forced radially into the cutting drums, and to positively force the cut ensilage out of the end of the said drums, we provide suitable means, such as curved discharge fingers 58 fastened to a suitable support, such as the interior of the hood 33 with their ends projecting into the interiors of the said cutting drums. These fingers will engage the material and deflect the same outwardly at the outer ends of the drums.

Here it may be noted that the upper shaft 51 is provided with a beveled gear 59 that meshes with a beveled pinion 39 on shaft 38 to drive the primary cutter or sickle 36.

Working above the rear portion of the delivery apron 30 is a relatively short overhead delivery apron 60 in the form of a slatted belt arranged to run over sprockets 61 and 62, the former of which is secured to a shaft 63 journaled in the upper portion of the hood 33. Shaft 63, at one end, has a small sprocket 64 and a sprocket chain 65 is arranged to run over said sprocket and over a sprocket 66 on the shaft 51 so that the said overhead delivery apron is driven from the said shaft 51.

Shaft 32, at its right hand end, has a sprocket 67 and a sprocket chain 68 runs over this sprocket and over a sprocket 69 on shaft 51, so that the lower or main delivery apron 30 is also driven from the shaft 51.

The two shafts 51 and 52, as above noted, are geared to rotate in synchronism. The said lower shaft 52 is driven from the traction wheel 17, as shown, through the following conections. The said traction wheels 17, on their inner faces, carry large spur gears 70 that mesh with spur pinions 71 that are normally loose on the outer ends of the lower shaft 52 and are provided on their hubs with half clutches 72. These half clutches 72 are adapted to be simultaneously engaged by sliding half clutches 73 that are keyed to rotate with, but free to slide on said shaft 52. For simultaneously moving the half clutches 73 they are subject to shipper levers 74 pivoted to the rear portion of the frame 15 and connected by suitable cables 74ᵃ to a lever 75 (see Fig. 1) on the front central portion of the main frame 15. By manipulation of the lever 75, the two gears 71 may be simultaneously connected to the shaft 52 or simultaneously disconnected therefrom, it being understood that suitable springs 76 will be provided for tending to cause the half clutches 73 to engage the said half clutch 72.

In Figs. 1 and 3 are shown long spring fingers 77 attached at their forward ends to one of their gathering forks 18 and extend rearward over the delivery apron 30 in position to co-operate with the toothed chain or belt 45 to hold the stalks more or less upright, while they are being delivered to the ensilage cutter.

The cut ensilage delivered from the cutting drums will be directed by the hood spout 34 into the receiving end of an elevating spout 78 that is suitably hung from the rear portion of the frame 15 and is provided with an endless blade-equipped elevator belt 79 arranged to run over suitable guiding sprockets 80 and preferably driven from the lower shaft 52 through driving mechanism including co-operating beveled gears 81, a shaft 82, co-operating beveled gears 83 and a shaft 84. This elevator and the said driving connections are but meagerly described, because they constitute no part of the present invention.

The operation of the mechanism described, briefly summarized, is substantially as follows:

Under forward movement of the machine, the standing stalks will be gathered between the forks 18 and gathering chains 19 and 20 and while in upright position, will be directed to the single or primary cutter 36 and there severed from the ground. Corn stalks that are so short that they do not reach up to the secondary cutters 40 will be delivered, top ends first, rearward, onto the delivery belt 30 but larger stalks will be cut in two by the secondary cutting disks 40; and here it should be stated that the toothed chain or belt 45 runs at higher speed than the apron 30, so that the severed end portions of the long stalks, by a sort of buckling action of the cut stalk, will be turned inward and delivered endwise to the ensilage cutter by the co-operative carrying actions of the apron 30 and belt 45. As the severed intermediate portions of the long stalks are buckled or forked rearward, the upper portions of such stalks will strike against the stop edge 35ᵃ of the hood extension 35 and will thereby be held back while the lower ends of the upper stalk sections and the upper ends of the lower stalk sections are being turned rearward for endwise delivery to the ensilage cutter.

The overhead apron 60 also assists in thus delivering the several stalks endwise to the ensilage cutter.

When the stalks are once brought endwise into engagement with the cutting drums of the ensilage cutter, they will, of course, be cut into short lengths and the drums, in their cutting action, will produce a positive drawing in or feeding of the stalks once gripped by the cutters. In fact, with these cutting drums, when the stalks are once brought into initial contact therewith, there is no further need of co-operating feeding mechanism for continuing the feeding action on the stalks thus delivered to the ensilage cutter.

With the wide double-edged cutter blades running in intermeshing relation, as shown, the stalks will be cut into very short lengths towit, into lengths less than the width of the space between co-operating blades, and the stalk sections thus cut will be crowded inward through the space between blades until they are delivered into the interior of the rotary cutting drums.

As already indicated, the cut ensilage will be delivered to the elevator and, by the latter, may be delivered into the box of a wagon driven at one side of the machine.

The machine illustrated in Figs. 7 to 12, inclusive, involves most of the features already described in connection with the views, Figs. 1 to 6, inclusive, but the machine here illustrated is designed to carry the cut stalks in upright positions to the ensilage cutter and then to deliver the same, butt ends downward, to said ensilage cutter.

In this modified arrangement, the cutting drums of the ensilage cutter are the same as already described but they, and their shafts are arranged with their axes 51 and 52 set considerably nearer to the same horizontal plane but connected for synchronous rotation through the gears 53 and 54, their connection for driving the sickle or primary cutter and means for simultaneously operating the co-operating sliding half clutches 85$^a$ are the same as previously described. In this arrangement, however, the half clutches 85$^a$ co-operate with half clutches on the hubs of sprocket wheels 85 on shaft 51 and sprocket chains 86 run over said sprocket wheels 85 and over larger sprockets 87 carried by the main traction wheels 17$^a$ on main axle 16.

In this arrangement also, the gathering frames 18$^a$ are made long and are extended back over an inclined deck 88 supported by the main frame 15 and at their rear ends, said frames 18$^a$ are connected by a stop yoke 89 that stops the upright stalks in a position immediately over the co-operative cutting drums of the ensilage cutter (see particularly Fig. 9). Mounted to work on each gathering frame 18$^a$ are upper and lower and intermediate inclined tooth-equipped gathering and feeding chains 90, 91 and 92, respectively. The lower portions of the chains 90, 91 and 92 run, respectively, over idle guide sprockets 93, 94 and 95$^a$ and at their upper portions, said chains run over sprockets 95 carried by obliquely set but approximately upright shafts 96 journaled in suitable bearings on the rear portions of the respective gathering frames. At their lower ends, the shafts 96 are connected by miter gears 97 to the shaft 52 of the most forward cutting drum. This arrangement, as is obvious, will cut the standing stalks, carry the same in approximately upright positions over the inclined deck 88 and deliver the same butt ends downward, to the ensilage cutter.

In practice, the frame 15 will be carried on the axle 16 by means permitting of vertical adjustment thereof, and as shown in Figs. 7 and 9, this means comprises yoke-like tooth segments 98 secured to the sides of the said frame 15, spur pinions 99 secured to said axle and meshing with the teeth of said yokes, a worm gear 100 secured to one end of said axle and a worm 101 meshing with said worm gear. Worm 101 is shown as secured to the front end of an operating shaft 102, the front end of which is mounted in and held against endwise movement by a forked bracket 103 mounted on the adjacent end of the axle 16. At its rear end, the operating rod 102 is mounted in a suitable bearing on the rear of frame 15 and is provided with an operating crank 104 by means of which said rod can be rotated to raise and lower the frame 15 and parts carried thereby.

The pole 105 is pivoted to one side of the front portion of frame 15 at 106, and for tilting the frame 15 so as to raise or lower the forward ends of the gathering frame 18$^a$, a latch lever 107 is pivoted to a latch arch 108 on the pole and is provided with a crank arm 109 that is connected by a link 110 and a forwardly projecting portion of frame 15.

In this last described form of the machine, the ensilage cutter also preferably delivers to an elevator spout and endless conveyor that operates and is driven as already described, and as best shown in Fig. 10.

Fig. 13 illustrates a slight modification in the form of the ensilage cutting drum wherein the cutting blades 111 are detachable and are rigidly but detachably secured to the flange 112 of the disk-like wheel 113 by means of small nut-equipped bolts 114. The cutting blades 111, like the cutting blades previously described, are concavely ground so that they have cutting edges at both sides.

Fig. 14 illustrates a further modification of the cutting drum in which the cutting blades 115 are single-edged, are made L-shaped in cross section and, by small nut-equipped bolts 116, are detachably secured to a flange 117 of the wheel or disk 118.

In the drawings, the various cutting and feeding devices are illustrated as driven from the traction wheels and in the type of ensilage cutter illustrated, the machine is assumed to be drawn forward by horses or by a small tractor, but it will, of course, be understood that the ensilage cutter itself may carry its own power either for driving the entire machine or for driving the ensilage cutter or other parts.

The secondary cutter incorporated in the machine illustrated in Figs. 1 to 6, inclusive, is a desirable feature and is especially important in the cutting of heavy corn stalks. However, the secondary cutter may be dispensed with on the said machine and the machine will operate to bend or buckle the long corn stalks rearward at their intermediate portions and to deliver the intermedate portions of said bent stalks endwise to the ensilage cutter.

The form of ensilage cutter herein illustrated and claimed is also illustrated in our pending application S. N. 820,305 filed March 2nd, 1914, and entitled "Combination harvester" and the present application is filed as a division of the said prior application.

What we claim is:

1. An ensilage cutter comprising co-operating rotary drums having intermeshing circumferentially spaced blades arranged for a combined cutting and feeding action on the stalks delivered thereto, said drums having hollow interiors into which the cut ensilage is forced, means for forcibly delivering the stalks to said drums, and means for discharging the cut ensilage from the interiors of said drums.

2. An ensilage cutter comprising co-operating rotary drums having intermeshing circumferentially spaced blades arranged for a combined cutting and feeding action on stalks delivered endwise thereto, the said drums having hollow interiors and peripheral openings into which the cut ensilage is forced, and means for discharging the cut ensilage from the interiors of said drums.

3. An ensilage cutter comprising co-operating rotary drums having intermeshing circumferentially spaced blades arranged for a combined cutting and feeding action on stalks delivered endwise thereto, the said drums having hollow interiors and peripheral openings into which the cut ensilage is forced, means for delivering stalks endwise to said cutters and forcing said stalks into said cutters and the interior of said drums.

4. In an ensilage cutter, a pair of co-operating cutters operative on stalks delivered thereto endwise with a combined cutting and feeding action, means for rotating said cutters in synchronism, means for adjusting the one cutter circumferentially forward or rearward, and means comprising two conveyors travelling at different speeds, adapted to deliver the stalks to said drums, substantially as described.

5. An ensilage cutter comprising co-operating rotary drums having intermeshing circumferentially spaced blades arranged for a combined cutting and feeding action on stalks delivered endwise thereto, means independently of said cutters for rotating said drums in synchronism, means for setting one of said drums circumferentially forward or rearward in respect to the other, and means comprising two conveyors travelling at different speeds, adapted to deliver the stalks to said drums, substantially as described.

6. An ensilage cutter comprising co-operating rotary drums having intermeshing circumferentially spaced blades arranged for a combined cutting and feeding action, intermeshing gears connected to said drums for causing the same to rotate in synchronism, means for adjusting one of said gears forward or rearward in respect to the drum to which it is connected, and means comprising two conveyors travelling at different speeds and adapted to deliver the ends of stalks to said drums.

7. An ensilage cutter comprising co-operating rotary drums having intermeshing circumferentially spaced blades arranged for a combined cutting and feeding action on stalks delivered endwise thereto, the said cutters having wide outer portions sharpened at both edges to thereby produce a double cutting action on the stalks passed between the blades of the co-operating drums.

8. An ensilage cutter comprising co-operating rotary drums having intermeshing circumferentially spaced blades arranged for a combined cutting and feeding action on stalks delivered endwise thereto, the said cutters having wide outer portions sharpened at both edges to thereby produce a double cutting action on the stalks passed between the blades of the co-operating drums, the said drums having hollow interiors into which the cut ensilage is forced, the said drums being open at their ends for the discharge of the ensilage therefrom.

9. An ensilage cutter comprising co-operantig rotary drums having intermeshing circumferentially spaced blades arranged for a combined cutting and feeding action on stalks delivered endwise thereto, the said cutters having wide outer portions sharpened at both edges to thereby produce a double cutting action of the stalks passed between the blades of the co-operating drums, the said drums having hollow interiors into which the cut ensilage is forced, the said drums being open at their ends for the discharge of the ensilage therefrom, and discharge devices extended into the ends of said drums for positively forcing the ensilage out of the same.

In testimony whereof we affix our signatures.

ANDREAN G. RONNING.
ADOLPH RONNING.